United States Patent
Chan et al.

(10) Patent No.: US 8,416,741 B2
(45) Date of Patent: Apr. 9, 2013

(54) MACHINE-TO-MACHINE COMMUNICATIONS OVER FIXED WIRELESS NETWORKS

(75) Inventors: Yee Sin Chan, San Jose, CA (US); Jin Yang, Orinda, CA (US); Pingping Zong, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 311 days.

(21) Appl. No.: 12/876,631

(22) Filed: Sep. 7, 2010

(65) Prior Publication Data

US 2012/0057476 A1 Mar. 8, 2012

(51) Int. Cl.
  *H04W 4/00* (2009.01)
  *H04W 72/00* (2009.01)
(52) U.S. Cl. .................... 370/329; 455/452.2
(58) Field of Classification Search .......... 370/252, 370/253, 329, 330, 341–347, 349, 400, 401; 455/450–452.2
See application file for complete search history.

(56) References Cited

U.S. PATENT DOCUMENTS

| | | | |
|---|---|---|---|
| 2008/0232284 A1* | 9/2008 | Dalsgaard et al. | 370/310 |
| 2010/0056074 A1* | 3/2010 | Higuchi et al. | 455/77 |
| 2010/0220623 A1* | 9/2010 | Cave et al. | 370/252 |
| 2010/0322165 A1* | 12/2010 | Yoo | 370/329 |

* cited by examiner

*Primary Examiner* — Kerri Rose

(57) ABSTRACT

One or more devices determine uplink signal strength for a machine-to-machine (M2M) device using a wireless access network. The one or more devices identify a default uplink transmission mode that requires the M2M device to employ transmission time interval (TTI) bundling, when the uplink signal strength is below a particular threshold, and identify a default uplink transmission mode that requires the M2M device to not employ TTI bundling, when the uplink signal strength is not below the particular threshold. The one or more devices store, in a memory, the default transmission mode for the M2M device. The one or more devices retrieve, from the memory and during a wake-up time window associated with the M2M device, the default transmission mode for the M2M device and construct, for the M2M device, an uplink scheduling grant based on the stored default transmission mode.

23 Claims, 6 Drawing Sheets

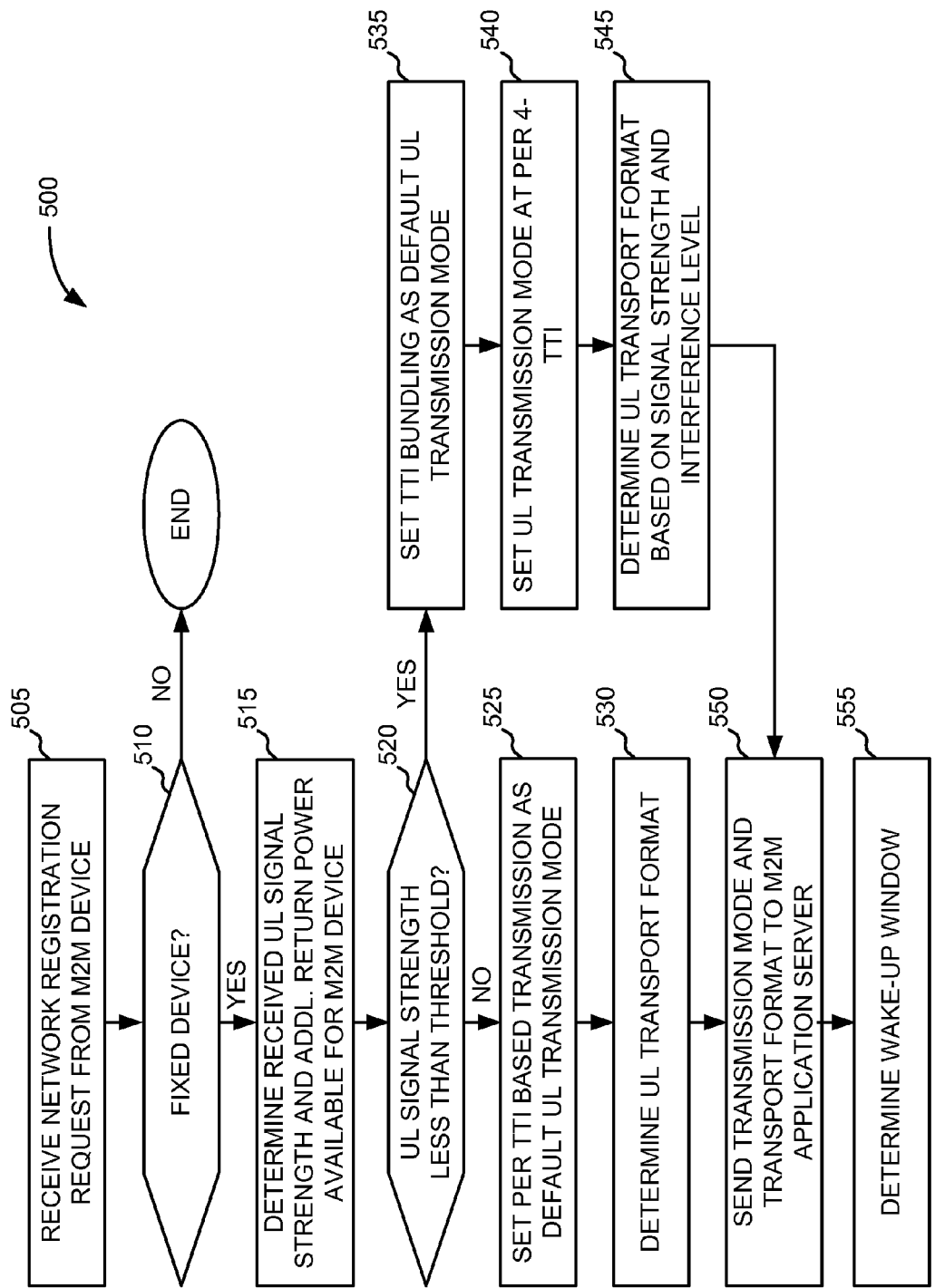

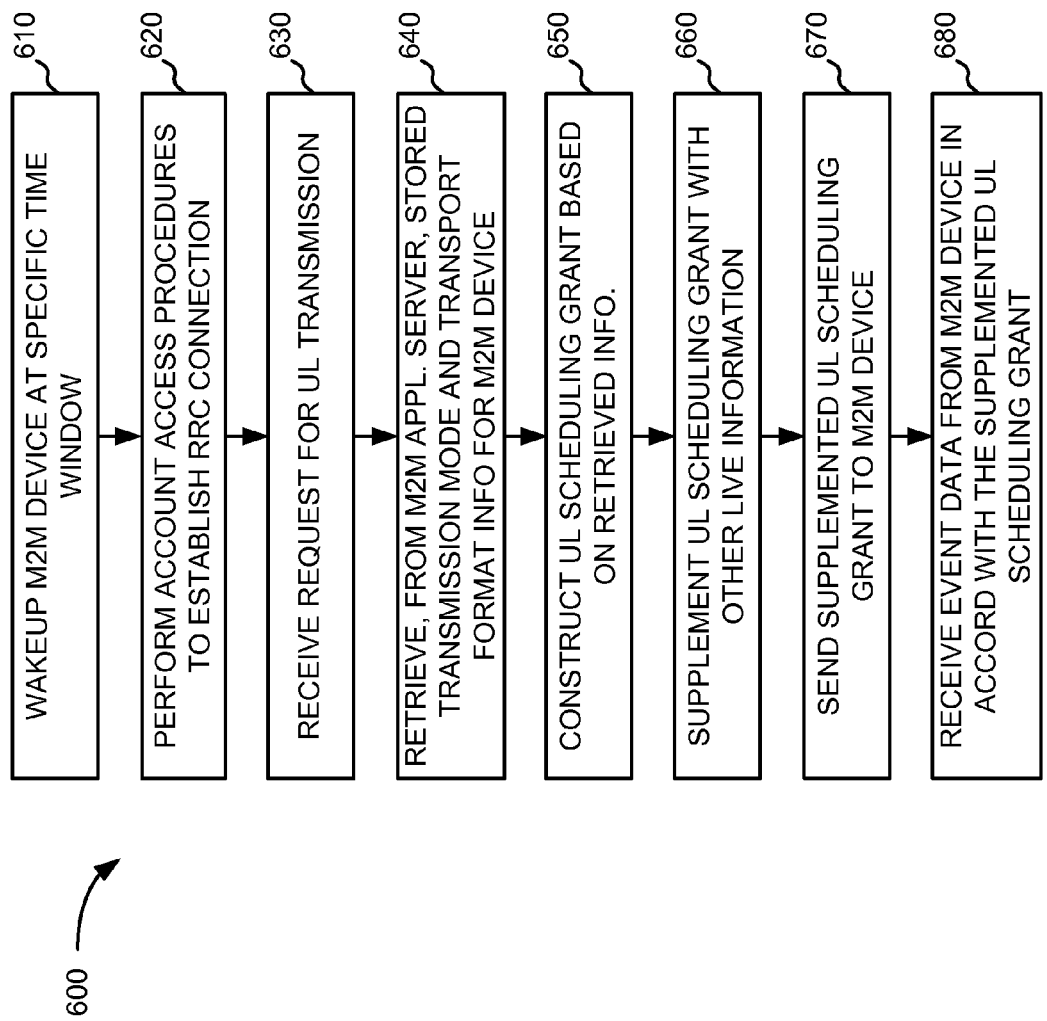

MACHINE-TO-MACHINE COMMUNICATIONS OVER FIXED WIRELESS NETWORKS

BACKGROUND

Machine-to-Machine (M2M) communications may refer to technologies that allow devices to communicate with one another over wired or wireless networks. M2M communications can be found in a number of economic sectors, such as security, product tracking, health care, and remote monitoring and diagnostics. An M2M device may include a sensor, a meter, or other device that captures an "event" (e.g., meter reading, temperature, inventory level, etc.), which is relayed through a network (e.g., wireless, wired, or hybrid) to an application that may translate the captured event into meaningful information (e.g., an indication that an item needs to be restocked). Thus, M2M communications may be characterized by periodic, semi-periodic, or on-demand transmission of small amounts of data.

M2M applications are commonly deployed using wireless networks, such as Long Term Evolution (LTE) networks or Universal Mobile Telecommunications System (UMTS) networks. M2M devices (or "clients") are frequently designed as relatively low cost devices that can be deployed by an end-user. Accordingly, the communication intelligence in these M2M devices may be relatively limited. While the data rate from one M2M device could be small, a large number of M2M clients residing in a network may easily exhaust air interface resources, such as a random access channel and/or control channels.

BRIEF DESCRIPTION OF THE DRAWINGS

FIG. 5 is a flow chart of an example process for installing a mechanism to support M2M communications over a wireless broadband network according to an implementation described herein; and FIG. 6 is a flow chart of an example process for operating a mechanism to support M2M communications over a wireless broadband network according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may support machine-to-machine (M2M) communications over a fixed wireless network, such as a Long Term Evolution (LTE) network. In one implementation, the systems and/or methods may retrieve signal strength information for a fixed M2M device, may determine uplink grant settings for the M2M device based on the signal strength, and may store the uplink grant settings for later retrieval. When an event data transmission period occurs for the M2M client, the systems and/or methods may also retrieve the stored uplink grant settings, apply live information from the network, and send a customized uplink scheduling to the M2M device.

Figure 1:
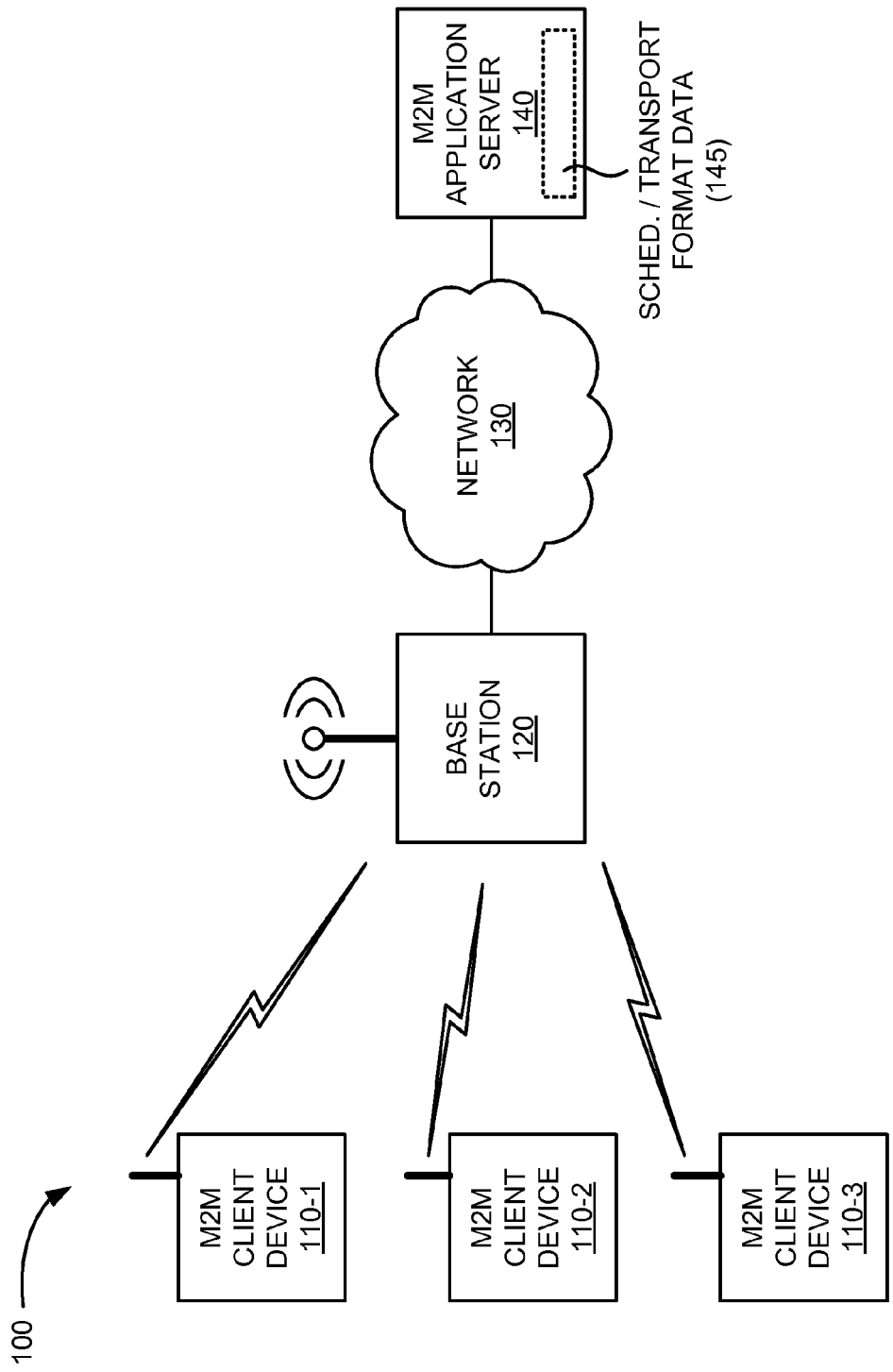
FIG. 1 is a diagram of an example network in which systems and/or methods described herein may be implemented.

FIG. 1 is a diagram of an example network 100 in which systems and/or methods described herein may be implemented. As illustrated, network 100 may include M2M client devices 110-1, 110-2, and 110-3 (collectively referred to as "M2M client devices 110" and singularly as "M2M client device 110"), a base station 120, a network 130, and an M2M application server 140. Three M2M client devices 110, one base station 120, one network 130, and one M2M application server 140 have been illustrated in FIG. 1 for simplicity. In practice, there may be more M2M client devices 110, networks 130, base stations 120, and M2M application servers 140.

M2M client device 110 may include a mobile terminal by which event data may be relayed through base station 120/network 130 to M2M application server 140. M2M client device 110 may be referred to in some contexts as user equipment (UE). Event data may be provided by establishing a wireless communication link with base station 120. M2M client device 110 may be installed at a fixed remote location, such as a particular location on a customer premises. Each fixed remote location may provide differing RF signal strength (e.g., depending on distance, terrain, etc.) in relation to base station 120. Also, since M2M communications generally utilize services through a mobile wireless network, it is also possible that M2M client device 110 may be installed on a mobile platform, such as a vehicle or portable container.

Base station 120 may include a device that handles wireless transmissions to and from M2M device 110 to provide access to and from network 130. Base station 120 may include antennas and related transceiver circuitry for connecting to M2M client devices 110 over a wireless access network. For example, base station 120 may include a wireless station, such as an eNodeB in a Long Term Evolution (LTE) system, a Node B in a UMTS, a base transceiver station (BTS) in a Global System for Mobile Communications (GSM) system, etc. In one particular implementation, base station 120 may utilize LTE standards operating in a 700 MHz frequency band. Additionally, or alternatively, base station 120 may include a device for amplifying a signal, coding/decoding a signal and/or forwarding a signal (e.g., a repeater or a relay). Additionally, or alternatively, base station 120 may include a device for attaching and/or inserting an additional signal or information to a signal before forwarding, amplifying, and/or decoding it. In this regard, base station 120 is intended to be broadly interpreted to include any type of node that may perform one or more operations in accordance with a wireless environment.

Network 130 may include any type of network, such as a wide area network (WAN), a local area network (LAN), a public switched telephone network (PSTN), a cellular network, the Internet, a private network, or a combination of networks. Network 130 may provide services and/or resources to facilitate communications between M2M client device 110/base station 120 and M2M application server 140. In one implementation, network 130 may include a core network that is implemented by a single entity, such as a wireless service provider, to provide wireless telecommunication services to user equipment, such as M2M client devices 110.

M2M application server 140 may include one or more server devices, or other types of computation or communication devices, that gather, process, search, and/or provide information in a manner described herein. M2M application server 140 may receive event data from M2M client device 110 and translate, store, and/or disseminate the event data for particular customers. In an implementation described herein, M2M application server 140 may also receive, from base station 120, information needed for the construction of an uplink (e.g., from M2M client device 110 to base station 120) scheduling grant for a particular M2M client device 110. M2M application server 140 may store the uplink scheduling grant information for the M2M client device 110 as scheduling/transport format data 145, along with scheduling/transport format data 145 for other M2M client devices 110. In another implementation, M2M application server 140 may store upgrade information, such as software updates, configuration updates, settings, etc., for M2M client device 110. The stored information may be transmitted to M2M client device 110 during a prescheduled wakeup window (e.g., associated with the uplink scheduling grant).

In implementations described herein, base station 120 may employ an automated mechanism to reduce the communication overhead and transmission duration of M2M communications from M2M client devices 110. The automated mechanism may include an installation stage and an operation stage. In the installation stage, each M2M client device 110 may register with network 130 (e.g., via base station 120). Based on the information exchanged during the registration, base station 120 may assemble data for each M2M client device 110 that is stored as scheduling/transport format data 145 in M2M application server 140.

In the operation stage, at a designated wake-up time window for each M2M client device 110, base station 120 may receive a network connection request from M2M client device 110 and may retrieve, from M2M application server 140, the appropriate scheduling/transport format data 145 for M2M client device 110. Base station 120 may construct an uplink scheduling grant for M2M client device 110 and add other live information to the uplink scheduling grant. Base station 120 may forward the uplink scheduling grant to M2M client device 110, and M2M client device 110 may transmit M2M communications data based on the uplink scheduling grant information. In one implementation, base station 120 may also provide, to M2M client device 110, upgrade information (e.g., software updates, configuration updates, settings, etc.) retrieved from M2M application server 140.

While implementations herein are described primarily in the context of broadband services via LTE, other wireless protocols may be used. For example, components conforming to LTE standards described herein may be replaced by components conforming to other network protocols (e.g., GSM, UMTS, wideband code division multiple access (WCDMA), Ultra Mobile Broadband (UMB), Code Division Multiple Access 2000 (CDMA2000), High-Speed Packet Access (HSPA), Worldwide Interoperability for Microwave Access (WiMax), etc. based protocols).

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
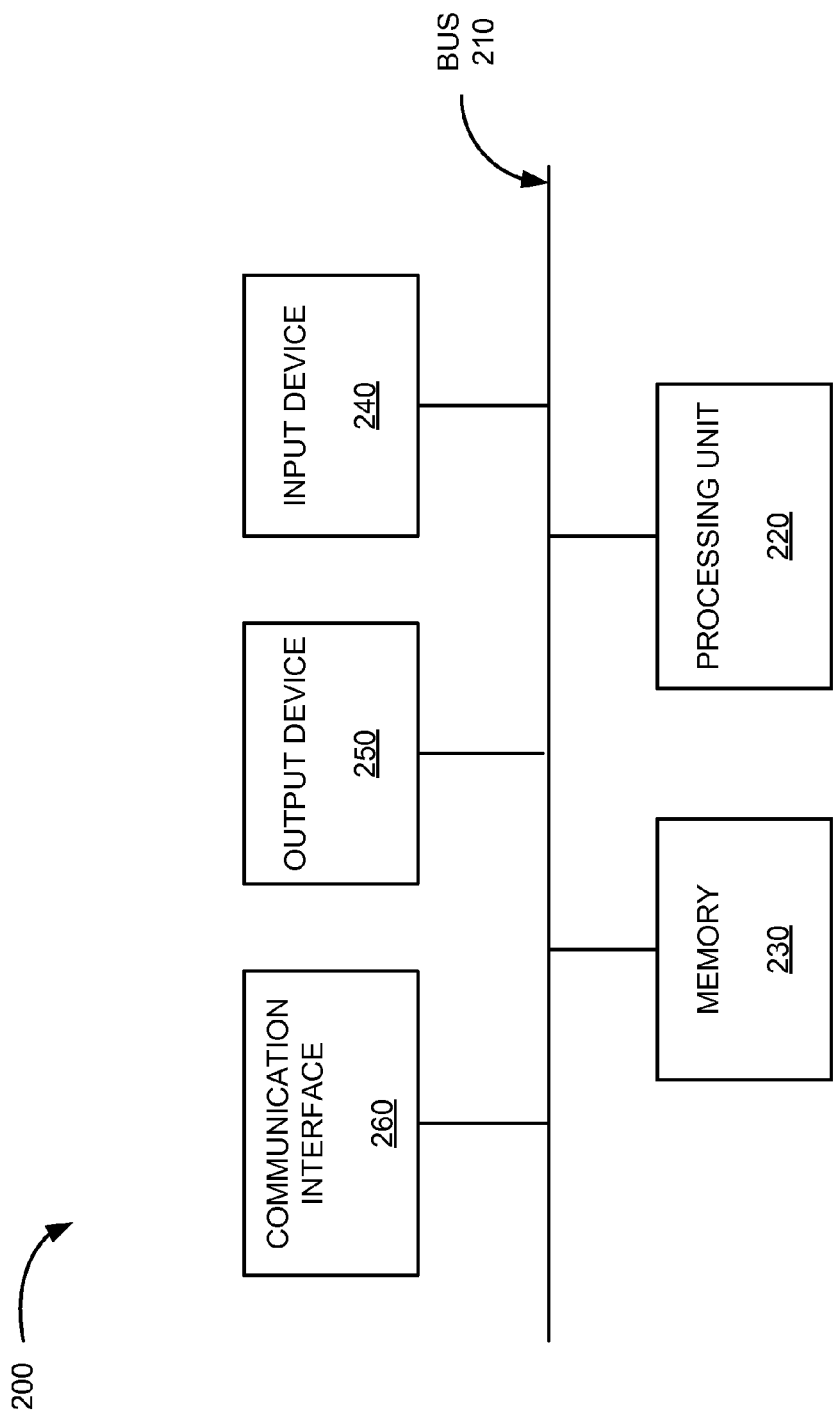
FIG. 2 is a diagram of example components of a device that may correspond to one of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
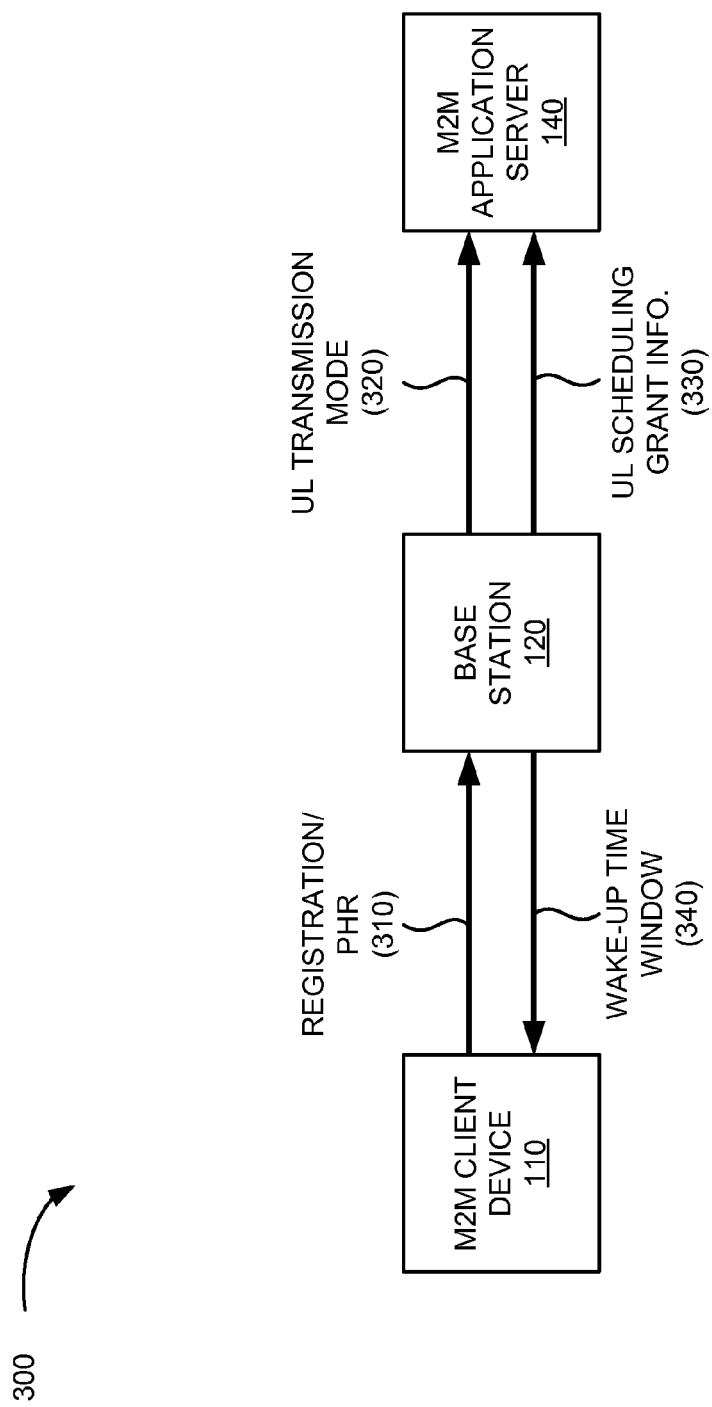
FIG. 3 is a diagram of example interactions among components of an example portion of the network depicted in FIG. 1.

FIG. 3 is a diagram of example interactions between components of an example portion 300 of network 100. The interactions in FIG. 3 may relate to installing a mechanism to support M2M communications over a wireless broadband network. As illustrated, network portion 300 may include M2M client device 110, base station 120, and M2M application server 140. M2M client device 110, base station 120, and M2M application server 140 my include features described above in connection with, for example, FIGS. 1 and 2.

M2M client device 110 may conduct a network registration process with base station 120. The network registration process may identify M2M client device 110 as a fixed (e.g., not mobile) device. (If the registration process identifies M2M client device 110 as a mobile device, base station 120 may not conduct additional installation processing for the mobile M2M client device 110.) During the registration process, base station 120 may detect uplink (UL) signal strength. As further shown in FIG. 3, the network registration process may also cause M2M client device 110 to provide a power headroom report (PHR) to base station 120, as indicated by reference number 310. M2M client device 110 may, for example, provide the PHR to base station 120 as part of the network registration process or in response to a particular request (not shown) from base station 120. The PHR may indicate how much additional power can be used by M2M client device 110 to transmit data. More particularly, base station 120 can use the PHR to determine how much more uplink bandwidth per subframe M2M client device 110 is capable of using.

Generally, the PHR may be used, by base station 120, to allocate a proper amount of radio frequency (RF) resources for M2M client device 110. As an illustration, assume that a maximum transmit power of M2M client device 110 is 10 Watts (W) and that M2M client device 110 currently uses an 8 W power output using a 10 MHz frequency range. If a 20 MHz frequency range is allocated to M2M client device 110, M2M client device 110 would need 16 W of power (8 W*2). However, as the maximum transmit power of the terminal is limited to 10 W (for this illustration), M2M client device 110 would not be able to use the entire 20 MHz frequency range if the 20 MHz frequency range is allocated to M2M client device 110. Thus, base station 120 may allocate a more suitable frequency range for M2M client device 110.

Base station 120 may evaluate metrics associated with the uplink signal strength of M2M client device 110 and the PHR to determine if M2M client device 110 can achieve a particular signal strength. For example, the PHR may provide the base station 120 with information about the difference between the nominal maximum transmitting power of M2M client device 110 and the current transmitting power of M2M client device 110. Base station 120 may determine the additional return power available at M2M client device 110 based on the PHR. For example, to improve signal strength, transmit power of M2M client device 110 can be adjusted by base station 120 sending a Transmit Power Control (TPC) command to M2M client device 110. In one implementation, base station 120 may compare the uplink signal strength of M2M client device 110 to a threshold signal strength value to classify the uplink signal strength (e.g., for M2M client device 110) as 'acceptable' or 'poor.'

Based on the uplink signal strength, base station 120 may assign an uplink transmission mode for M2M client device 110 and provide the uplink transmission mode (e.g., as uplink (UL) transmission mode 320) to M2M application server 140. For example, if registration/PHR 310 from M2M client device 110 indicates acceptable RF signal conditions (e.g., at or above a threshold value), base station 120 may assign uplink transmission mode 320 to a default transmission mode using each transmission time interval (TTI) (e.g., a conventional transmission mode). However, if registration/PHR 310 from M2M client device 110 indicates poor RF signal conditions (e.g., below a threshold value) and that M2M client device 110 is not able to increase RF transmission power, base station 120 may assign uplink transmission mode 320 to a default transmission mode using TTI bundling. Base station 120 may provide uplink transmission mode 320 to M2M application server 140.

TTI bundling, defined, for example, in 3GPP Technical Specification 36.321, may generally be applied to improve cell edge coverage and base station reception. Base station 120 may direct M2M client device 110 to send, using TTI bundling, the same packet (e.g., with different error detection and correction bits) to base station 120 in multiple (e.g., 2, 3 or 4), consecutive TTIs without waiting for a Hybrid Automatic Repeat Request (HARQ) indicator. The HARQ indicator may be carried by the Physical Hybrid ARQ Indicator Channel (PHICH) and indicates whether a base station (e.g., base station 120) has correctly received a transmission from a device (e.g., M2M client device 110) on a Physical Uplink Shared Channel (PUSCH). TTI bundling may thus, reduce signaling overhead and improve latency for poor RF conditions (e.g., when compared to relying on error detection of a single packet transmission, feedback, and requesting subsequent retransmissions). In an example implementation, base station 120 may assign a per 4-TTI bundling mode as the default mode for poor RF signal conditions. In another implementation, base station 120 may select a TTI bundling multiple (e.g., 2, 3 or 4) based on uplink signal strength of M2M client device 110 and/or other network information.

Based on the received signal strength and interference level (e.g., determined from registration/PHR 310), base station 120 may also determine the information needed for the construction of an uplink scheduling grant for M2M client device 110. The information for the uplink scheduling grant may include, for example, an uplink transport format (e.g., a modulation and coding scheme (such as one MCS-1 through MCS-9 as defined by the 3GPP) depending on the capability of M2M client device 110, a transmission mode (e.g., multiple-input multiple-output (MIMO), space frequency block coding (SFBC)) depending on the capability of M2M client device 110, duration of assignment, and/or payload sizes. Base station 120 may send the information for uplink scheduling grant information 330 to M2M application server 140 for storage (e.g., with scheduling/transport format data 145) and later retrieval (e.g., by base station 120) during an operation stage described below. In one implementation, uplink transmission mode 320 and uplink scheduling grant information 330 may be stored together, for example, by M2M application server 140 as scheduling/transport format data 145.

Base station 120 may also determine a wake-up (e.g., from sleep mode to active mode) time window 340 for M2M client device 110. Wake-up time window 340 may be determined, for example, based on scheduling information (e.g., from M2M application server 140) that includes an event data transmission schedule for M2M client device 110. In one implementation, base station 120 may provide wake-up time window 340 to M2M client device 110. In another implementation, base station 120 may locally store and track wake-up time window 340 for M2M client device 110.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
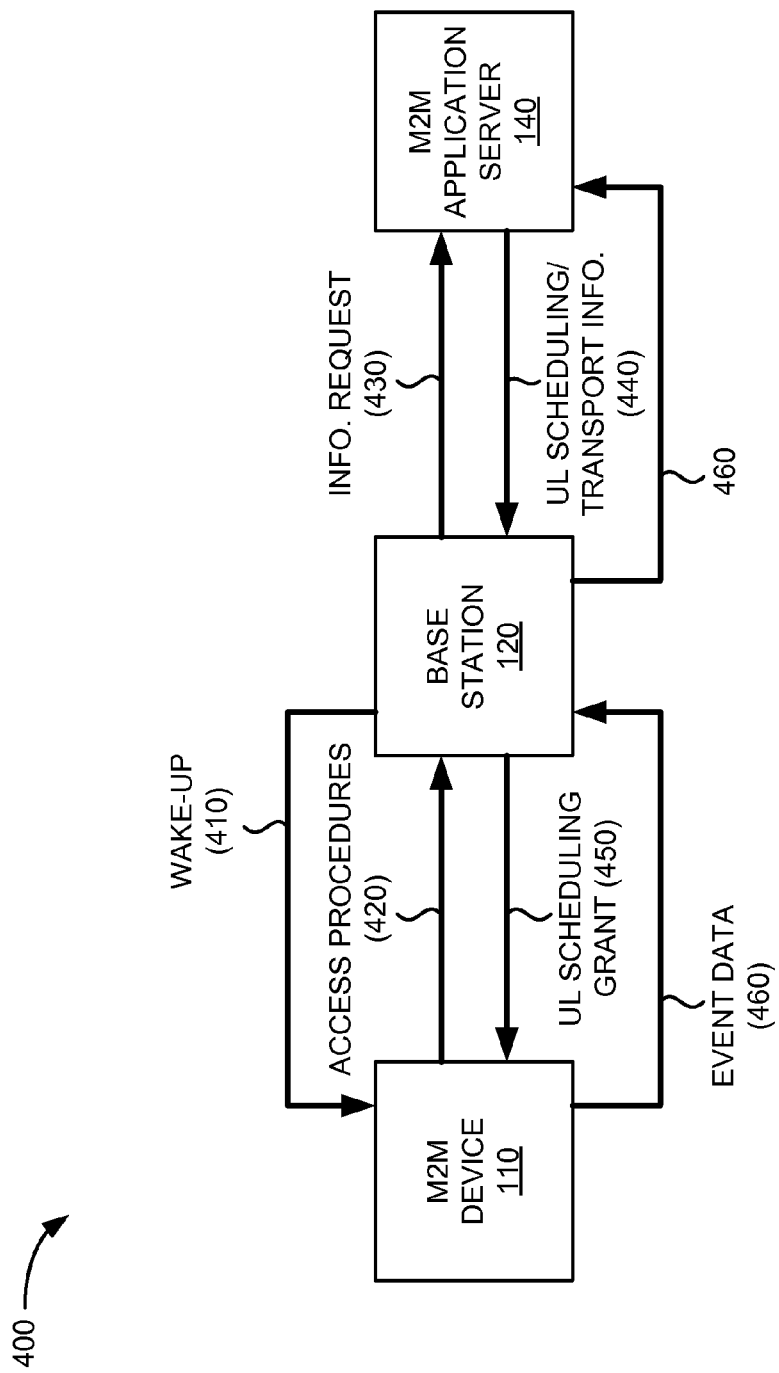
FIG. 4 is a diagram of example interactions among components of another example portion of the network depicted in FIG. 1.

FIG. 4 is a diagram of example interactions between components of an example portion 400 of network 100. The interactions in FIG. 4 may relate to operating a mechanism to support M2M communications over a wireless broadband network. As illustrated, network portion 400 may include M2M client device 110, base station 120, and M2M application server 140. M2M client device 110, base station 120, and M2M application server 140 my include features described above in connection with, for example, FIGS. 1-3.

As further shown in FIG. 4, base station 120 may provide a wake-up signal 410 to trigger M2M client device 110 to access the network at a particular wake-up time window. Wake-up signal 410 may be used, for example, if base station 120 did not previously provide wake-up time window 340 to M2M client device 110 in the installation stage (FIG. 3).

Based on either of wake-up signal 410 or the previously provided wake-up time, M2M client device 110 can provide to base station 120 an access request, during the wake-up time window, to initiate access procedures 420 to access the network. M2M client device 110 and base station 120 may perform proper network access procedures and establish a radio resource control (RRC) connection.

In one implementation, when M2M client device 110 enters the RRC connected mode (e.g., after completing access procedures 420), M2M client device 110 can wait for an uplink scheduling grant from base station 120. Base station 120 may automatically initiate steps to prepare the uplink scheduling grant based on a stored wake-up time window for M2M client device 110. Alternatively, M2M client device 110 can send a separate request for uplink transmission (not shown), or piggyback the request for uplink transmission with an RRC connection request during the network access procedures 420.

Upon receiving the request for uplink transmission and/or based on the stored wake-up time window for M2M client device 110, base station 120 may send an information request 430 to M2M application server 140 to retrieve a uplink transmission mode and uplink scheduling grant information, particular to M2M client device 110, that was previously generated during the installation stage. M2M application server 140 may retrieve (e.g., from scheduling/transport format data 145) the requested information as uplink scheduling/transport information 440 and send it to base station 120. Uplink scheduling/transport information 440 may include, for example, transport format (e.g., multiple antenna, modulation coding schemes, etc), TTI bundling (e.g., enable or disable bundling, bundling intervals, etc.), duration of assignment, payload sizes, etc. In one implementation, uplink scheduling/transport information 440 may also include other information for M2M client device 110, such as software updates, configuration updates, settings, etc.

Base station 120 may receive uplink scheduling/transport information 440 and construct an uplink scheduling grant 450, which may be provided to M2M client device 110. For example, base station 120 may add other live information, such as a resource block and/or a TTI number, to uplink scheduling/transport information 440 to provide a final uplink scheduling grant 450. In one implementation, final uplink scheduling grant 450 may also include the other information for M2M client device 110 (e.g., software updates, configuration updates, settings, etc.).

M2M client device 110 may receive uplink scheduling grant 450 and send event data 460 (e.g., M2M metering data), via base station 120, to M2M application server 140 or another M2M server (not shown). M2M client device 110 may send event data 460 in accordance with uplink scheduling grant 450 such that use of air interface resources is minimized. In one implementation, M2M client device 110 may also implement changes based on the other information (e.g., software updates, configuration updates, settings, etc.) included with final uplink scheduling grant 450.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

FIG. 5 is a flow chart of an example process 500 for installing a mechanism to support M2M communications over a wireless broadband network. In one implementation, process 500 may be performed by base station 120. In another implementation, some or all of process 500 may be performed by another device or group of devices, including or excluding base station 120.

As illustrated in FIG. 5, process 500 may include receiving a network registration request from a M2M device (block 505), determining if the M2M device is a fixed device (block 510), and, if the M2M device is not a fixed device (block 510—NO), stopping the installation process. For example, in implementations described above in connection with FIG. 3, M2M client device 110 may conduct a network registration process with base station 120. The network registration process may identify M2M client device 110 as a fixed (e.g., not mobile) device. If the registration process identifies M2M client device 110 as a mobile device, base station 120 may not conduct additional installation processing for the mobile M2M client device 110.

If the M2M device is a fixed device (block 510—YES), the received uplink signal strength and the additional return power available for the M2M device may be determined (block 515), and it may be determined if the uplink signal strength is less than a threshold (block 520). For example, in implementations described above in connection with FIG. 3, base station 120 may evaluate metrics associated with the uplink signal strength of M2M client device 110 and the PHR to determine if M2M client device 110 can achieve a particular signal strength. For example, the PHR may provide base station 120 with information about the difference between the nominal maximum transmitting power of M2M client device 110 and the current transmitting power of M2M client device 110. Base station 120 may determine the additional return power available at M2M client device 110 based on the PHR. For example, to improve signal strength, transmit power of M2M client device 110 can be adjusted by base station 120 sending a Transmit Power Control (TPC) command to M2M client device 110. In one implementation, base station 120 may compare the uplink signal strength of M2M client device 110 to a threshold signal strength value to classify the uplink signal strength (e.g., for M2M client device 110) as 'acceptable' or 'poor.'

Returning to FIG. 5, if the uplink signal strength is not less than the threshold (block 520—NO), per TTI transmission may be set as the default uplink (UL) transmission mode (block 525) and the uplink (UL) transport format may be determined (block 530). For example, in implementations described above in connection with FIG. 3, based on the uplink signal strength, base station 120 may assign an uplink transmission mode for M2M client device 110 and provide the uplink transmission mode (e.g., as uplink transmission mode 320) to M2M application server 140. For example, if registration/PHR 310 from M2M client device 110 indicates acceptable RF signal conditions (e.g., at or above a threshold value), base station 120 may assign uplink transmission mode 320 to a default transmission mode using each transmission time interval TTI (e.g., no TTI bundling).

If the uplink signal strength is less than the threshold (block 520—YES), TTI bundling may be set as the default transmission mode (block 535), the uplink transmission mode may be set at per 4-TTI (block 540), and the uplink transport format may be determined based on the signal strength and interference level (block 545). For example, in implementations described above in connection with FIG. 3, if registration/PHR 310 from M2M client device 110 indicates poor RF signal conditions (e.g., below a threshold value) and that M2M client device 110 is not able to increase RF transmission power, base station 120 may assign uplink transmission mode 320 to a default transmission mode using TTI bundling. In an example implementation, base station 120 may assign a per 4-TTI bundling mode as the default mode for poor RF signal conditions. In another implementation, base station 120 may select a TTI bundling multiple (e.g., 2, 3 or 4) based on uplink signal strength of M2M client device 110 and/or other network information.

The transmission mode and transport format may be sent to an M2M application server (block 550), and a wake-up window may be determined (block 555). For example, in implementations described above in connection with FIG. 3, base station 120 may provide uplink transmission mode 320 and uplink scheduling grant information 330 to M2M application server 140. Uplink transmission mode 320 and uplink scheduling grant information 330 may be stored, for example, by M2M application server 140 as scheduling/transport format data 145. Base station 120 may also determine wake-up (e.g., from sleep to active mode) time window 340 for M2M client device 110. In one implementation, base station 120 may provide wake-up time window 340 to M2M client device 110. In another implementation, base station 120 may locally store and track wake-up time window 340 for M2M client device 110.

FIG. 6 is a flow chart of an example process 600 for operating a mechanism to support M2M communications over a wireless broadband network. In one implementation, process 600 may be performed by base station 120. In another implementation, some or all of process 600 may be performed by another device or group of devices, including or excluding base station 120.

As illustrated in FIG. 6, process 600 may include waking up a M2M device (block 610), and performing account access procedures to establish a RRC connection (block 620). For example, in implementations described above in connection with FIG. 4, base station 120 may provide wake-up signal 410 to trigger M2M client device 110 to access the network at a particular wake-up time window. Wake-up signal 410 may be used, for example, if base station 120 did not previously provide wake-up time window 340 to M2M client device 110 in the installation stage. M2M client device 110 can provide to base station 120 an access request, during the wake-up time window, to initiate access procedures 420 to access the network. M2M client device 110 and base station 120 may perform proper network access procedures and establish a RRC connection.

A request for an uplink transmission maybe received (block 630), and stored transmission mode and transport format info for the M2M device may be retrieved from a M2M application server (block 640). For example, in implementations described above in connection with FIG. 4, M2M client device 110 can send a separate request for uplink transmission, or piggyback the request for uplink transmission with a RRC connection request during the network access procedures 420. Upon receiving the request for uplink transmission and/or based on the stored wake-up time window for M2M client device 110, base station 120 may send information request 430 to M2M application server 140 to retrieve a uplink transmission mode and uplink scheduling grant information, particular to M2M client device 110, that was previously generated during the installation stage.

An uplink scheduling grant may be constructed based on the retrieved information (block 650), and the uplink scheduling grant may be supplemented with other live information (block 660). For example, in implementations described above in connection with FIG. 4, base station 120 may receive uplink scheduling/transport information 440 and construct uplink scheduling grant 450. Base station 120 may add other live information, such as a resource block and/or a TTI number, to uplink scheduling/transport information 440 to provide a final uplink scheduling grant 450.

The supplemented uplink scheduling grant may be sent to the M2M device (block 670), and event data may be received from the M2M device in accord with the supplemented uplink scheduling grant (block 680). For example, in implementations described above in connection with FIG. 4, the final uplink scheduling grant 450 may be provided to M2M client device 110. M2M client device 110 may receive uplink scheduling grant 450 and send event data 460 (e.g., M2M metering data), via base station 120, to M2M application server 140 or another M2M server (not shown). M2M client device 110 may send event data 460 in accordance with uplink scheduling grant 450 such that use of air interface resources is minimized.

Systems and/or methods described herein may determine uplink signal strength for a M2M device using a wireless access network. The systems and/or methods may identify a default uplink transmission mode that requires the M2M device to employ transmission time interval (TTI) bundling, if the signal strength is below a particular threshold, and may identify a default uplink transmission mode that requires the M2M device to not employ TTI bundling, if the signal strength is not below the particular threshold. The systems and/or methods may store, in a memory, the default transmission mode for the M2M device. The systems and/or methods may retrieve, from the memory and during a wake-up time window associated with the M2M device, the default transmission mode for the M2M device and may construct, for the M2M device, an uplink scheduling grant based on the stored default transmission mode.

The systems and/or methods described here in may reduce the communication overhead and transmission duration in the wireless access network, thereby improving the capacity of the number of M2M devices supported. The systems and/or methods described herein may also extend the coverage for M2M applications, may reduce the use of control channels within the wireless access network, and may improve efficiency.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. This component may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   determining, by a base station, an uplink signal strength for a machine-to-machine (M2M) device using a wireless network;
   setting, by the base station and when the uplink signal strength is below a particular threshold, a default uplink transmission mode for the M2M device to employ transmission time interval (TTI) bundling;
   setting, by the base station and when the uplink signal strength is not below the particular threshold, the default uplink transmission mode for the M2M device to not employ TTI bundling;
   determining, by the base station, an uplink transport format for the M2M device based on the uplink signal strength and the default uplink transmission mode;
   sending, by the base station and to an M2M server, the default uplink transmission mode and the uplink transport format for storage;
   retrieving, by the base station and from the M2M server, the stored default uplink transmission mode and the stored uplink transport format from the M2M server; and
   constructing, by the base station for the M2M device, an uplink scheduling grant based on the stored default uplink transmission mode and the stored uplink transport format.

2. The method of claim 1, further comprising:
   determining, by the base station, that the M2M device is a fixed location device.

3. The method of claim 1, further comprising:
   determining, by the base station, a wake-up time window for the M2M device, where the retrieving the stored default uplink transmission mode and the stored uplink transport format from the M2M server is based on the wake-up time window.

4. The method of claim 1, where constructing the uplink scheduling grant is initiated based on one of:
   a stored wake-up time window for the M2M device,
   receiving, from the M2M device, a request for uplink transmission.

5. The method of claim 4, where the request for the uplink transmission is included as one of:
   a separate request signal, or
   a piggyback request with a signal for establishing a radio resource control (RRC) connection.

6. The method of claim 1, where the uplink scheduling grant further includes upgrade information for the M2M device, where the upgrade information includes one or more of:
   software updates,
   configuration updates, or
   settings.

7. The method of claim 1, where the default uplink transmission mode for the M2M device to employ TTI bundling includes using a four-TTI bundle.

8. The method of claim 1, further comprising:
   adding, to the uplink scheduling grant, live information for the M2M device, where the live information includes a resource block or a TTI value for the wireless network.

9. The method of claim 1, where the wireless network conforms to one of:
   a Long Term Evolution (LTE) standard,
   a Global System for Mobile Communications (GSM) standard,
   a wideband code division multiple access (WCDMA) standard,
   an Ultra Mobile Broadband (UMB) standard,
   a Universal Mobile Telecommunications System (UMTS) standard,
   a Code Division Multiple Access 2000 (CDMA2000) standard,
   a High-Speed Packet Access (HSPA) standard, or
   a Worldwide Interoperability for Microwave Access (WiMax) standard.

10. A method, comprising:
    establishing, by a base station and with a machine-to-machine (M2M) device, a radio resource control (RRC) connection for a wireless network;
    retrieving, by the base station and from a server, transmission mode information and transport format information for the M2M device;
    constructing, by the base station, an uplink scheduling grant, for the M2M device, based on the retrieved transmission mode information and transport format information;
    supplementing, by the base station, the uplink scheduling grant with live information associated with the wireless network, to form a supplemented uplink scheduling grant;
    sending, by the base station and to the M2M device, the supplemented uplink scheduling grant; and
    receiving, by the base station and from the M2M device, event data for M2M communications, where the event data is transmitted in accordance with the supplemented uplink scheduling grant.

11. The method of claim 10, where the transmission mode information and transport format information for the M2M device is retrieved from a memory including transmission mode information and transport format information for a plurality of M2M devices.

12. The method of claim 10, further comprising:
    receiving, from the M2M device and via the RRC connection, a request for an uplink transmission over the wireless network connection.

13. The method of claim 10, further comprising:
    determining a wake-up time window for the M2M device; and
    sending, to the M2M device, a trigger to access a network during the wake-up time window.

14. A method of claim 10, further comprising:
    determining a wake-up time window for the M2M device;
    sending, to the M2M device, information about the wake-up time window; and
    receiving, from the M2M device during the wake-up time window, a request to access a network.

15. The method of claim 10, where the retrieved transmission mode information and transport format information is based on previous signal strength calculations for the M2M device, and where the retrieved transmission mode information and transport format includes:
a transmission time interval (TTI) bundling mode, when the signal strength is below a particular threshold, or
a non-TTI bundling mode, when the signal strength is not below the particular threshold.

16. The method of claim 15, where the retrieved transmission mode information and transport format further includes:
a modulation and coding scheme (MCS) based on the capability of the M2M device, or
a multiple-input, multiple-output (MIMO) setting based on the capability of the M2M device.

17. The method of claim 10, where the wireless network is a Long-Term Evolution (LTE) network.

18. One or more devices, comprising:
a memory to store a plurality of instructions; and
a processor to execute instructions in the memory to:
determine that a machine-to-machine (M2M) device is a fixed location device;
determine, if the M2M device is a fixed location device, an uplink signal strength for the M2M device using a wireless access network,
identify a default uplink transmission mode that requires the M2M device to employ transmission time interval (TTI) bundling, when the uplink signal strength is below a particular threshold,
identify a default uplink transmission mode that requires the M2M device to not employ TTI bundling, when the uplink signal strength is not below the particular threshold,
store, in the memory, the default uplink transmission mode for the M2M device,
retrieve, from the memory and during a wake-up time window associated with the M2M device, the default uplink transmission mode for the M2M device, and
construct, for the M2M device, an uplink scheduling grant based on the stored default uplink transmission mode.

19. The device of claim 18, where the processor is further to:
determine an uplink transport format for the M2M device,
store, in the memory, the uplink transport format for the M2M device,
retrieve, from the memory and during the wake-up time window associated with the M2M device, the uplink transport format for the M2M device, and construct the uplink scheduling grant based further on the uplink transport format for the M2M device.

20. The device of claim 18,
wherein the uplink transport format includes:
a modulation and coding scheme (MCS) based on a capability of the M2M device, or
a multiple-input, multiple-output (MIMO) setting based on the capability of the M2M device.

21. The device of claim 18, where the processor is further to:
identify a bundle size for the TTI bundling, if the signal strength is below the particular threshold.

22. The device of claim 18, where the processor is further to:
supplement the uplink scheduling grant with live information associated with the wireless access network, to form a supplemented uplink scheduling grant,
send, to the M2M device, the supplemented uplink scheduling grant; and
receive, from the M2M device, event data for M2M communications, where the event data is transmitted, over the wireless access network, in accordance with the supplemented uplink scheduling grant.

23. The device of claim 18, where the wireless access network is a Long-Term Evolution (LTE) network.

* * * * *